(12) United States Patent
Chini et al.

(10) Patent No.: US 9,008,128 B2
(45) Date of Patent: Apr. 14, 2015

(54) LOW-COST PORT SYNCHRONIZATION METHOD IN MULTIPORT ETHERNET DEVICES

(71) Applicant: Broadcom Corporation, Irvine, CA (US)

(72) Inventors: Ahmad Chini, Mission Viejo, CA (US); Mehmet Vakif Tazebay, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 188 days.

(21) Appl. No.: 13/890,154

(22) Filed: May 8, 2013

(65) Prior Publication Data

US 2014/0294133 A1    Oct. 2, 2014

Related U.S. Application Data

(60) Provisional application No. 61/807,265, filed on Apr. 1, 2013.

(51) Int. Cl.
*H04J 3/16* (2006.01)
*H04J 3/06* (2006.01)
*H04L 7/033* (2006.01)

(52) U.S. Cl.
CPC .............. *H04L 7/0331* (2013.01); *H04J 3/0673* (2013.01); *H04J 3/0658* (2013.01)

(58) Field of Classification Search
CPC .... H04L 7/0331; H04J 3/0635; H04J 3/0638; H04J 3/0685; H04J 3/0658; H04J 3/0697
USPC ......... 370/350, 503, 507, 509, 510, 518, 519; 375/356, 376
See application file for complete search history.

(56) References Cited

U.S. PATENT DOCUMENTS

| | | | |
|---|---|---|---|
| 8,819,161 B1 * | 8/2014 | Pannell et al. ................. | 709/208 |
| 2010/0150288 A1 * | 6/2010 | Zhu et al. ........................ | 375/356 |
| 2013/0308658 A1 * | 11/2013 | Le Pallec et al. ............. | 370/503 |

* cited by examiner

*Primary Examiner* — Hanh N Nguyen
(74) *Attorney, Agent, or Firm* — McDermott Will & Emery LLP

(57) ABSTRACT

A method for frequency synchronization of a multiport device may include recovering a clock frequency of a master port of a first device that is linked to the multiport device at a slave port of the multiport device. A clock frequency of the slave port may be locked to the recovered-clock frequency of the master port of the first device. Frequency data may be stored in a first frequency register associated with the slave port. The stored frequency data may include a difference between the recovered-clock frequency of the master port of the first device and a local-clock frequency of the multiport device. A clock frequency of one or more master ports of the multiport device may be synchronized with the locked clock frequency of the slave port by coupling the first frequency register to frequency registers associated with one or more master ports.

20 Claims, 4 Drawing Sheets

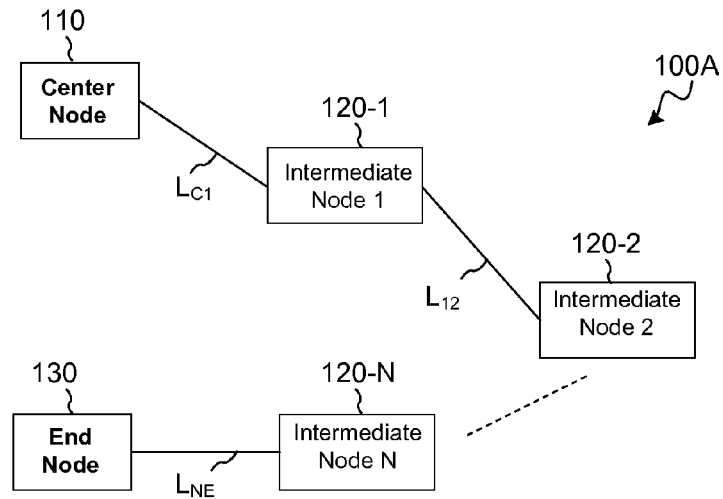
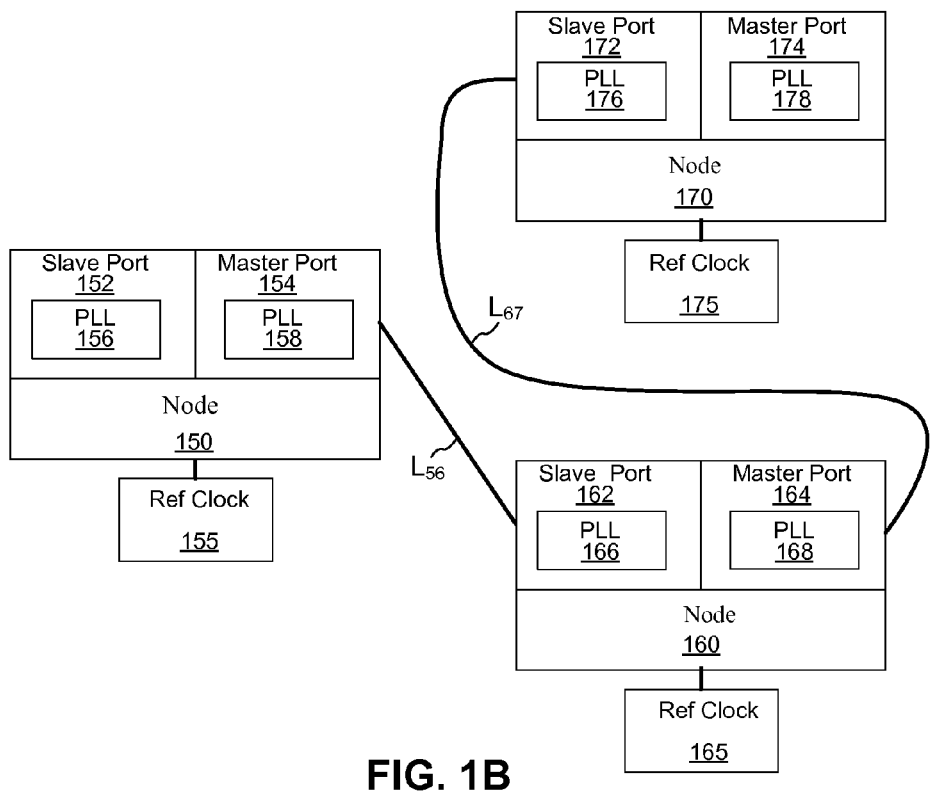
FIG. 1A
FIG. 1B

LOW-COST PORT SYNCHRONIZATION METHOD IN MULTIPORT ETHERNET DEVICES

CROSS-REFERENCES TO RELATED APPLICATIONS

The present application claims the benefit of priority from U.S. Provisional Patent Application Ser. No. 61/807,265, filed on Apr. 1, 2013, which is hereby incorporated by reference in its entirety for all purposes.

TECHNICAL FIELD

The present description relates generally to Ethernet communications, and more particularly, but not exclusively, to a low-cost port synchronization method in multiport Ethernet devices.

BACKGROUND

Ethernet technology has been widely accepted and used in many applications. As specified in IEEE 802.3 series of specifications, various data rates may be supported at distances up to 100 meters. There are many applications with longer range requirements that may use multiple Ethernet link segments for establishing a connection between two nodes. In addition to range requirements, other networking constraints may result in multiple Ethernet link segments between two communication nodes. As an example application, a connection between one or more mobile base stations and a center node may include multiple Ethernet link segments.

In certain applications, for example, connecting a mobile base station to a center node, there may also be a tight clock synchronization requirement between two data communication nodes. When multiple Ethernet link segments are used to connect the base station to the center node, each link segment may be on a different clock frequency reference, violating synchronization requirement between the mobile base station (e.g., an end node) and the center node.

BRIEF DESCRIPTION OF THE DRAWINGS

Certain features of the subject technology are set forth in the appended claims. However, for purpose of explanation, several embodiments of the subject technology are set forth in the following figures.

FIG. 1A illustrates an example of a multi-segment Ethernet link in accordance with one or more implementations.

FIG. 1B illustrates an example of a multi-segment Ethernet link using dual-port nodes in accordance with one or more implementations.

DETAILED DESCRIPTION

Figure 2A:
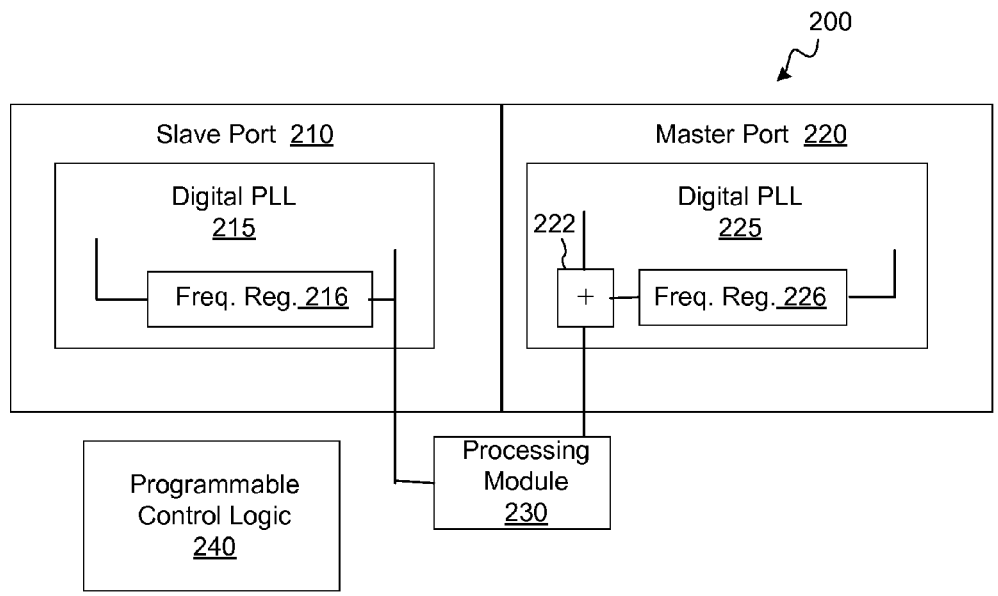
FIG. 2A illustrates an example of a dual-port device of the multi-segment Ethernet link of FIG. 1B in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

FIG. 1A illustrates an example of a multi-segment Ethernet link 100A in accordance with one or more implementations of the subject technology. The multi-segment Ethernet link 100A includes a center node 110 (e.g., a central station, a switching center, a packet-switch data network (PSDN) center), an end node 130 (e.g., a mobile base station), and a number of intermediate nodes 1-N (e.g., 120-1, 120-2 . . . 120-N) coupled via links $L_{C1}, L_{12} \ldots L_{NE}$ in a chain. Each two nodes (e.g., 120-1, 120-2) and the interconnecting link (e.g., $L_{12}$) forms a segment of the multi-segment link 100A. In one or more aspects, the links $L_{C1}, L_{12} \ldots L_{NE}$ may include optical fiber and/or Ethernet twisted cables. The one or more implementations of the subject technology, where one or more nodes (e.g., end node 130) of the multi-segment link 100A is a mobile base station, there may be a tight clock synchronization requirement between those two nodes.

It is also understood that when the multi-segment link 100A is used to connect a base station (e.g., the end node 130) to the center node 110, each link segment may be on a different clock frequency reference. This may violate synchronization requirement between the mobile base station and the center node. It is further understood that the two ends of each Ethernet link segment (e.g., nodes 120-1 and 120-2) are synchronized (e.g., are operated in a loop-timing mode) and operate on the same frequency domain (e.g., have similar operating frequencies). For example, in 1000 BASE-T and 10 GBT standards, when two Ethernet nodes are linked together, one node may be designated as a master node and another may be designated as a slave node. However, for multi-segment Ethernet links, each node may include more than one port and the synchronization requirement may need to be dealt with differently as addressed by the subject technology and disclosed herein.

FIG. 1B illustrates an example of a multi-segment Ethernet link 100B using dual-port nodes in accordance with one or more implementations of the subject technology. The multi-segment Ethernet link 100B includes dual-port nodes 150, 160, and 170 coupled via interconnection links L56 and $L_{67}$. The dual-port nodes 150, 160, and 170 are intermediate nodes and each includes a slave port (e.g., 152, 162, or 172) and a master port (e.g., 154, 164, or 174). In one or more aspects of the subject technology, the multi-segment link 100B may include more than three dual-port nodes (e.g., N nodes). In one or more aspects, one or more intermediate nodes of the multi-segment link 100B may include more than two ports (e.g., 4, 8, etc.). Each node of the multi-segment link 100B may be implemented as an integrated circuit or a chip (e.g., a PHY chip). The PHY chip may be a dual, a quad, or an octal port chip.

Each of the slave ports 152, 162, or 172 may include a slave-port phase-locked loop (PLL) (e.g., 156, 166, or 176), and each of the master ports 154, 164, or 174 may include a master-port PLL (e.g., 158, 168, or 178). Each of the PLLs 156, 166, 176, 158, 168, or 178 may use a reference clock signal generated by a reference clock (e.g., 155, 165, or 175)

to generate a local-clock signal. Before the link of a segment (e.g., between nodes 150 and 160) is locked, the master port 154 in node 150 may operate at the frequency set by the reference clock 155, and the slave port 162 in node 160 may operate at the frequency set by the reference clock 165. In order to establish the link, a loop-timing mechanism may be executed. According to the loop timing, the slave-port PLL 166 may act such that the local clock is locked to the master clock in node 150 (e.g., at the frequency set by the reference clock 155) by recovering the clock frequency of the master port 154 through the link segment $L_{56}$ connecting the port 150 to the port 160. Therefore, after the link is established, the slave port 162 may operate at the frequency of the reference clock 155, whereas the master port 164 of the same node (e.g., 160) may operate at the frequency of the reference clock 165. The loop-timing mechanism is part of IEEE 802.3 standard and is similarly executed by other segments of the multi-segment link 100B. For example, the slave port 172 may have to operate at the frequency of the reference clock 165 after the link $L_{67}$ is established. As a result, two network segments may have to be operating at two different clock frequencies, which is not desirable. Therefore, the two or more ports of each node need to be synchronized, as addressed by the subject technology and described in greater detail herein.

FIG. 2A illustrates an example of a dual-port device 200 of the multi-segment Ethernet link 100B of FIG. 1B in accordance with one or more implementations of the subject technology. The dual-port device (e.g., chip) 200 may be similar to the node 160 of FIG. 1B and may be part of a multi-segment link (e.g., 100A of FIG. 1A). The dual-port device 200 includes a slave port 210, a master port 220, and programmable control logic 240. The slave port 210 and the master port 220, respectively, include digital PLLs 215 and 225, which can use a reference clock signal generated by a reference clock (e.g., 165 of FIG. 1B) to generate a local-clock signal at a local-clock frequency. The digital PLLs 215 and 225, respectively, include, among other components, frequency registers 216 and 226 that are coupled (e.g., interfaced) through a processing module 230. As discussed before, when the link between the slave port 210 and a master port of another device (e.g., a multiport, such as a dual-port device) is established the digital PLL 215 may recover the operating frequency of that master port and operate at that frequency.

The digital PLL 215 may store in the frequency register 216 frequency data including a delta frequency ($\Delta f$) that is a difference between the recovered-clock frequency of the master port of the other device and the local-clock frequency of the dual-port device 200. It is understood that the $\Delta f$ is of the order of a few ppm (e.g., 10 ppm). The digital PLL 225 may be still operating at the local-clock frequency of the dual-port device 200. An objective of the subject technology is to synchronize the master port 220 to the slave port 210. The synchronization may be implemented by coupling the frequency register 226 to the frequency register 216. In one or more implementations of the subject technology, the synchronization of the master port 220 with the slave port 210 may be performed by the processing module 230. In this role, the processing module 230 may couple the frequency register 226 to the frequency register 216 through the summation block 222 and make the frequency register 226 to follow the frequency of the register 216 in terms of operating frequency. In one or more implementations, the processing module 230 may include a smoothing filter, as discussed in further detail below.

The programmable control logic 240 may include programmable registers and may allow designation of the two ports (e.g., in case of a multiport device) that are to be synchronized. In some implementations, the programmable control logic 240 may automatically detect the ports to be synchronized. The programmable control logic 240 may further allow enabling and disabling the synchronization feature. For example, in multiport chips with more than two ports, synchronized pairs of ports may be determined by registers of the programmable control logic 240. More than one master port may be synchronized with a single slave port through the control registers. The frequency synchronization circuit (e.g., summation block 222 and the processing module 230) may be activated or deactivated as the link on the slave port 210 (e.g., to another multiport device) is established or lost. In one or more implementations, the activation or deactivation of the frequency synchronization circuit may be performed by the programmable control logic 240. The programmable control logic 240 and the processing module 230 can be implemented in hardware. In one or more implementations, the processing module 230 can be implemented in software executable by, for example, a processor of the multiport device 200.

Figure 2B:
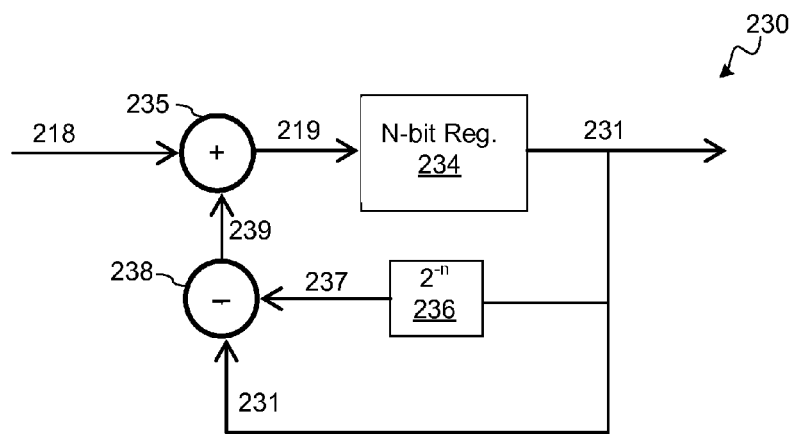
FIG. 2B illustrates an example of a processing module of the dual-port device of FIG. 2A in accordance with one or more implementations.

FIG. 2B illustrates an example of a processing module 230 of the dual-port device 200 of FIG. 2A in accordance with one or more implementations of the subject technology. The processing module 230 may include a smoothing filter that can perform averaging on the content (e.g., values of the stored delta frequency (Of) of the frequency register 216). The averaging can filter out (e.g., smoothen) the fluctuations of the values of the stored delta frequency (e.g., reduce clock signal jitters), before transferring to the frequency register 226. The PLL 225 may then use the content of the frequency register 226 to adjust its local clock frequency to match the operating frequency of the slave port 210.

In one or more aspects, the processing module 230 may be implemented by, but is not limited to, an infinite impulse response (IIR) filter, such as a leaky integrator. The leaky integrator may include an N-bit register 234, a divide-by-2" block 236, a summation block 235, and a subtraction module 238. A time constant of the leaky integrator may be defined by the positive integer n of the divide-by-2" block 236. The content of the frequency register 216 (e.g., signal 218) may be added by the summation block 235 to a signal 239 to generate a signal 219, which is stored in the N-bit register 234. The instantaneous content (e.g., signal 231) of the N-bit register 234 may be divided by 2" by the divide-by-2" block 236 to generate signal 237. The signal 237 may be subtracted from the signal 231, by the subtraction block 238 to generate the signal 239.

FIGS. 3A-3D illustrate examples of multiport devices 300, 330, 340, and 350 in accordance with one or more implementations of the subject technology. The multiport device 300 may include a PHY chip 310, which in turn, includes a number of ports 320-1, 320-2, 320-3 . . . 320-N, operating at frequencies f1, f2, f3 . . . fN, respectively. The multiport device 300 may be linked to multiple devices; each device in turn can be a multiport device. At any point of time, one or more of the ports 320-1, 320-2, 320-3 . . . 320-N may be linked to one or ports of another multiport device. For example, ports 320-2 may be a slave port linked to a master port of the first multiport device, and port 320-K may be a master port linked to a slave port of a second multiport device.

The PHY chip 310 may include a reference clock generator and programmable control logic (e.g., similar to 240 of FIG. 2A discussed above). The PLLs of the ports 320-1, 320-2, 320-3 . . . 320-N may use the reference clock generator to generate their own local-clock signals. The programmable control logic may automatically detect the ports to be synchronized (e.g., 320-2 and 320-K), and may further allow enabling and disabling the synchronization feature of the multiport device 300. According to one or more implementations, the frequency register of the master port 320-K may be synchronized with the recovered frequency of the slave port 320-2 (e.g., operating frequency of the first multiport device liked to the port 320-2) using a smoothing filter similar to the leaky integrator of FIG. 2B.

Figure 3A:
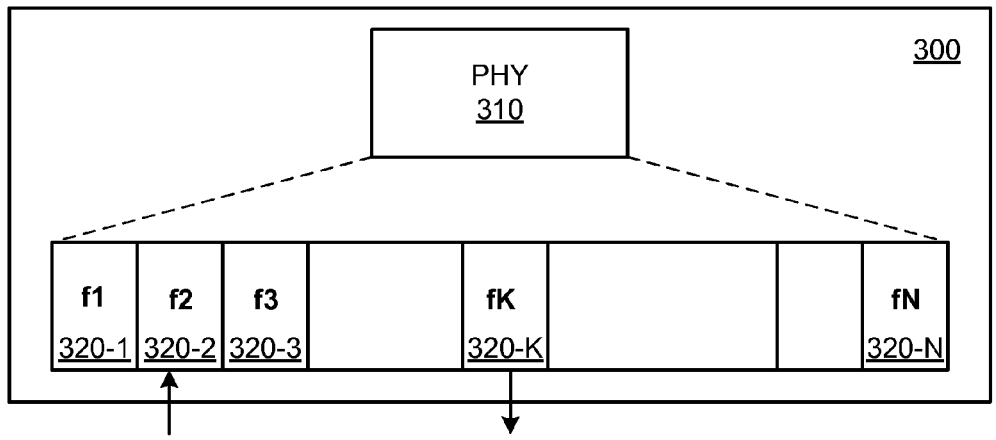
FIGS. 3A-3D illustrate examples of multiport devices in accordance with one or more implementations.
Figure 3B:
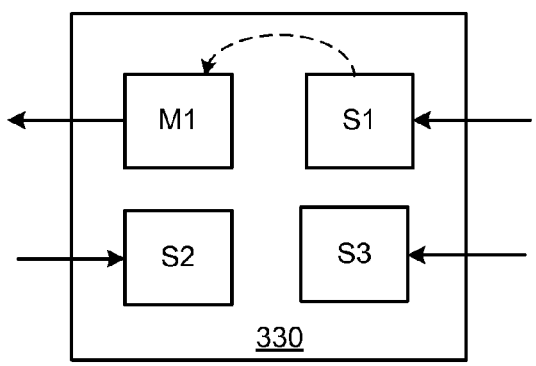

FIG. 3B shows an example quad-port 330 including one master port M1 and three slave ports S1-S3. The slave ports S1-S3 may be coupled to three separate devices (e.g., each with minimum of two ports). The only master port M1 in this case is shown to be synchronized, as described above, with the slave port S1. The ports M1 and S1 may be part of a multi-segment Ethernet link with loop timing. In one or more implementations, each of the slave ports S1-S3 may be part of a separate multi-segment link that are converging to another multi-segment link that may start at the master port M1. In one or more implementations, the three separate multi-segment links coupled to the slave ports S1-S3 may have identical frequency domains, which may require that the slave ports S1-S3 operate a the same frequency.

Figure 3C:
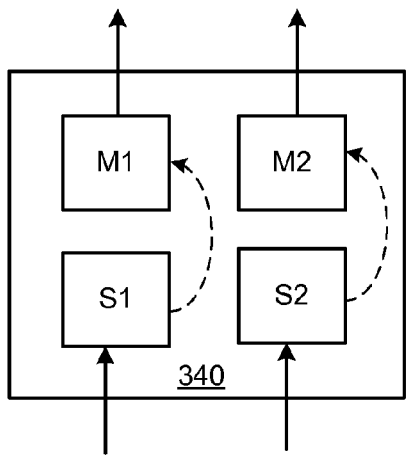

FIG. 3C shows an example quad-port 340 including two master ports M1 and M2 and two slave ports S1 and S2. In one or more implementations, the master ports M1 and M2 are respectively synchronized with the slave ports S1 and S2. The ports S1-M1 may be part of a first multi-segment Ethernet link with a first loop timing and ports S2-M2 may be part of a second multi-segment Ethernet link with a second loop timing.

Figure 3D:
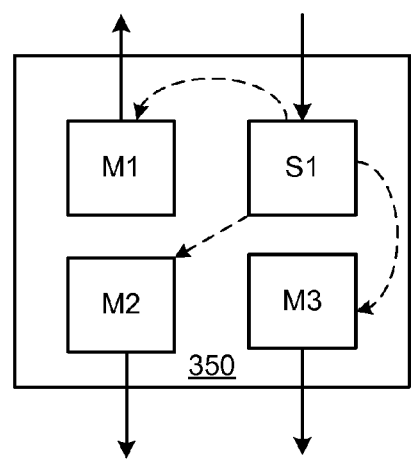

FIG. 3D shows an example quad-port 350 including three master ports M1-M3 and a slave ports S1. As shown, the master ports M1-M3 are synchronized with the slave port S1. The quad-port 350 is an example of branching out of three multi-segment links from master ports M1-M3 that share a common segment linked to the slave port S1. The multiport configurations shown in FIGS. 3A-3D are examples of various configurations of ports of a multiport device. In practice, other configurations may be conceived and/or implemented, which are not discussed here for brevity.

Although the various aspects of the subject technology disclosed herein are implemented within integrated multiport chips, they may also be implemented on ports of different chips on the same board or even ports on different boards with proper extension of the disclosed circuits and logics.

Figure 4:
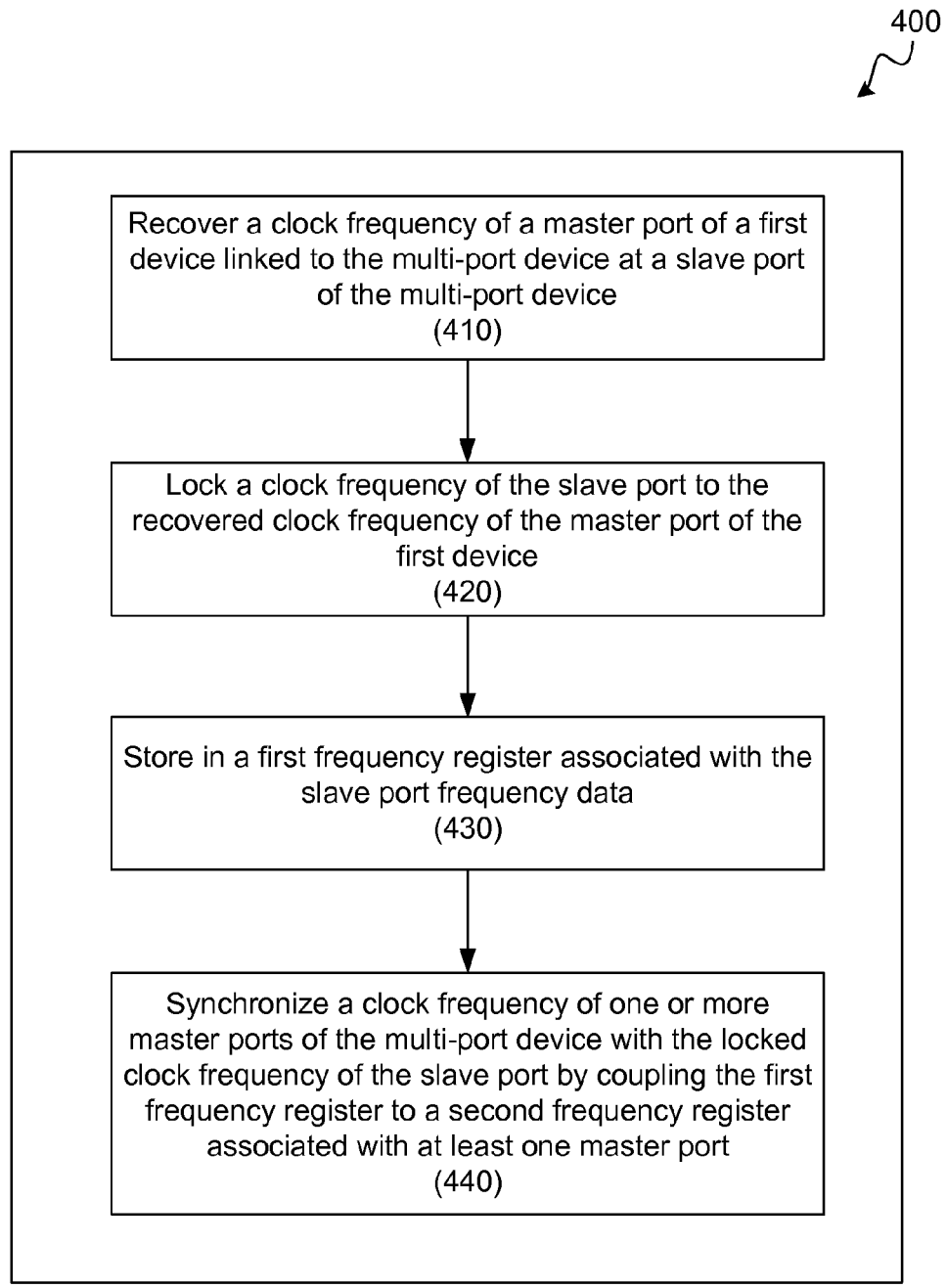
FIG. 4 illustrates an example method for frequency synchronization of a multiport device in accordance with one or more implementations.

FIG. 4 illustrates an example method 400 for frequency synchronization of a multiport device in accordance with one or more implementations of the subject technology. The method 400 may begin with operation block 410, where a clock frequency of a master port (e.g., 220 of FIG. 2A) of a first device (e.g., 150 of FIG. 1B) linked to the multiport device (e.g., 160 of FIG. 1B or 200 of FIG. 2A) may be recovered at a slave port (e.g., 210 of FIG. 2A) of the multiport device. At operation block 420, a clock frequency of the slave port may be locked to the recovered-clock frequency of the master port (e.g., 154 of FIG. 1B) of the first device. At operation block 430, frequency data may be stored in a first frequency register (e.g., 216 of FIG. 2A) associated with the slave port. At operation block 440, a clock frequency of one or more master ports (e.g., 220 of FIG. 2A) of the multiport device may be synchronized with the locked clock frequency of the slave port by coupling the first frequency register to a second frequency register (e.g., 226 of FIG. 12A) associated with the one or more master ports. The stored frequency data may be an indicative of a difference between the recovered-clock frequency of the master port of the first device and a local-clock frequency of the multiport device.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for frequency synchronization of a multiport device, the method comprising:
   recovering a clock frequency of a master port of a first device linked to the multiport device at a slave port of the multiport device;
   locking a clock frequency of the slave port to the recovered-clock frequency of the master port of the first device;
   storing, in a first frequency register associated with the slave port, frequency data; and
   synchronizing a clock frequency of at least one master port of the multiport device with the locked clock frequency of the slave port by coupling the first frequency register to a second frequency register associated with at least one master port,
   wherein the stored frequency data is indicative of a difference between the recovered-clock frequency of the master port of the first device and a local-clock frequency of the multiport device.

2. The method of claim 1, wherein the first frequency register associated with the slave port is associated with a first phase-locked loop (PLL) associated with the slave port, and the second frequency register associated with the at least one master port is associated with a second PLL associated with the at least one master port.

3. The method of claim 2, wherein coupling the first frequency register to the second frequency register comprises coupling the first frequency register to the second frequency register through a processing module, and wherein the method further comprises configuring the processing module to provide for the second PLL to follow the first PLL.

4. The method of claim 3, wherein the processing module comprises a smoothing filter, and wherein the method further comprises configuring the smoothing filter to reduce clock signal jitters.

5. The method of claim 4, wherein the smoothing filter comprises a leaky integrator, wherein the leaky integrator comprises an N-bit register and a divide-by-2" block, and wherein the method further comprises defining a time constant of the leaky integrator by n.

6. The method of claim 1, wherein the multiport device comprises an Ethernet node, and wherein a multiport device comprises a reference clock generator, and wherein the method further comprises generating the local-clock frequency of the multiport device based on a reference frequency generated by the reference clock generator.

7. The method of claim 6, wherein the multiport device comprises a plurality of slave ports, and wherein the method further comprises linking at least some slave ports of the plurality of slave ports to one or more nodes of a multi-segment Ethernet link, and synchronizing one or more master ports of the at least one master port with a slave port of the plurality of slave ports.

8. The method of claim 1, further comprising automatically detecting, by control logic, a plurality of ports of the multiport device for synchronization, wherein the method further comprises:
   configuring the control logic to selectively enable/disable an automatic detection of the plurality of ports of the multiport device for synchronization; and
   determining, by using the control logic, pairs of ports for synchronization.

9. The method of claim 1, further comprising:
   activating the frequency synchronization of the clock frequency of the at least one master port of the multiport device with the locked clock frequency of the slave port when a link between the slave port and the first device is established, and
   deactivating the frequency synchronization of the clock frequency of the at least one master port of the multiport device with the locked clock frequency of the slave port when the link between the slave port and the first device is lost.

10. A system comprising:
    a slave port configured to recover a clock frequency of a master port of a first device linked to the multiport device;
    a first phased-locked loop (PLL) configured to lock a clock frequency of the slave port to the recovered-clock frequency of the master port of the first device;
    a first frequency register to store frequency data, the first frequency register being associated with the slave port; and
    a second frequency register coupled to the first frequency register and configured to synchronize a clock frequency of at least one master port of the multiport device with the locked clock frequency of the slave port, the second frequency register being associated with the at least one master port,
    wherein the stored frequency data is indicative of a difference between the recovered-clock frequency of the master port of the first device and a local-clock frequency of the multiport device.

11. The system of claim 10, wherein the first frequency register is associated with the first PLL, wherein the first PLL is associated with the slave port, and wherein the second frequency register is associated with a second PLL associated with the at least one master port.

12. The system of claim 11, further comprising a processing module configured to couple the second frequency register to the first frequency register, and wherein the processing module comprises a circuit that is configured to provide for the second PLL to follow the first PLL.

13. The system of claim 12, wherein the processing module comprises a smoothing filter, and wherein the smoothing filter is configured to reduce clock signal jitters.

14. The system of claim 13, wherein the smoothing filter comprises a leaky integrator, wherein the leaky integrator comprises an N-bit register and a divide-by-2" block, and wherein the leaky integrator is configured to have a time constant that is defined by n.

15. The system of claim 10, wherein:
    the system comprises a multiport device, wherein the multiport device comprises an Ethernet node, the multiport device comprises a reference clock generator, and the reference clock generator is configured to generate a reference frequency that is used to generate the local-clock frequency of the multiport device.

16. The system of claim 15, wherein the multiport device comprises a plurality of slave ports, and at least some slave ports of the plurality of slave ports are linked to one or more nodes of a multi-segment Ethernet link, and wherein one or more master ports of the at least one master port are synchronized with a slave port of the plurality of slave ports.

17. The system of claim 10, further comprising control logic configured to automatically detect a plurality of ports of the multiport device for synchronization, wherein the control logic is further configured to allow enabling and disabling an automatic detection of the plurality of ports of the multiport device for synchronization, and wherein the control logic is further configured to determine pairs of ports for synchronization.

18. The system of claim 17, wherein the control logic is further configured to activate a frequency synchronization of the clock frequency of the at least one master port of the multiport device with the locked clock frequency of the slave port when a link between the slave port and the first device is established, and to deactivate the frequency synchronization of the clock frequency of the at least one master port of the multiport device with the locked clock frequency of the slave port when the link between the slave port and the first device is lost.

19. A multiport device comprising:
a slave port configured to recover a clock frequency of a master port of a first device linked to the multiport device;
a slave phased-locked loop (PLL) configured to lock a clock frequency of the slave port to the recovered-clock frequency of the master port of the first device; and
a master frequency register coupled to a slave frequency register and configured to facilitate synchronizing a clock frequency of at least one master port of the multiport device with the locked clock frequency of the slave port, wherein:
the master and slave frequency registers are associated, respectively, with the at least one master port and the slave port,
the slave frequency register stores frequency data, and
the stored frequency data comprises information pertaining the recovered-clock frequency of the master port of the first device and a local-clock frequency of the multiport device.

20. The multiport device of claim 19, wherein:
the master frequency register is associated with a master PLL, and wherein the master PLL is associated with the at least one master port,
information pertaining the recovered-clock frequency comprises a difference between the recovered-clock frequency of the master port of the first device and a local-clock frequency of the multiport device,
the multiport device further comprises a processing module configured to couple the master frequency register to the slave frequency register,
the processing module comprises a circuit that is configured to provide for the master PLL to follow the slave PLL,
the processing module comprises a smoothing filter configured to reduce clock signal jitters,
the smoothing filter comprises a leaky integrator comprising an N-bit register and a divide-by-$2^n$ block, and
the leaky integrator is configured to have a time constant that is defined by n.

* * * * *